United States Patent

[11] 3,568,071

[72] Inventor Beat A. Kocher
Alameda, Calif.
[21] Appl. No. 769,096
[22] Filed Oct. 21, 1968
[45] Patented Mar. 2, 1971
[73] Assignee The Singer Company

[54] DIGITAL FILTER
1 Claim, 3 Drawing Figs.

[52] U.S. Cl. .......... 328/48, 307/215, 328/164
[51] Int. Cl. .......... H03k 21/32
[50] Field of Search .......... 328/44, 48, 164; 307/215

[56] References Cited
UNITED STATES PATENTS

| | | | |
|---|---|---|---|
| 2,841,705 | 7/1958 | Moerman .......... | 328/46X |
| 3,028,551 | 4/1962 | Secretan .......... | 328/48X |
| 3,044,065 | 7/1962 | Barney et al. .......... | 328/48X |
| 3,096,483 | 7/1963 | Ransom .......... | 328/48 |

*Primary Examiner*—John S. Heyman
*Attorney*—Charles R. Lepchinsky

ABSTRACT: In a system for accepting each change of signal level as part of a message pulse only if it persists for a prescribed time, that time is measured with a high-speed counter to give high precision and to reduce the jitter that is imposed on the recovered message. A separate counter for each input signal level runs in response to that level and is reset in response to the other level. On reaching a prescribed count it passes a signal to an output flip-flop.

INVENTOR
Beat A. Kocher
BY Karl H. Sommermeyer
ATTORNEY

DIGITAL FILTER

BACKGROUND OF THE INVENTION

1. Field of the Invention

The present invention relates to filters for removing short noise pulses from digital signals.

2. Description of the Prior Art

Noise in a digital transmission may introduce extra pulses, may split message pulses and may advance or delay the beginning and endings of message pulses.

It has been attempted to measure the length of time that each signal level (e.g. one or zero) persists and accept it as part of the message only if the measurement shows a predetermined persistence.

One proposed system would test the signal at discrete times and accept a level that was the same at two successive tests. Such a system suffers an imprecision in the time measurement which is equal to the interval between tests, and so adds to the message a large time variation, or jitter, which constitutes more noise. It fails to resolve separate noise pulses that persist less than such interval, and so many accept a pair of suitably-spaced noise pulses as a message pulse.

Another system, such as that of U.S. Pat. No. 2,851,598 preserves the signal in a delay line. Coincidence of the delayed and nondelayed signals is accepted as persistence for the delay time. While this system adds less jitter to the signal, it still poorly resolves separate noise pulses and can pass a pair of spaced, noise pulses as a message pulse.

In another system, a relaxation timer, such as a one-shot multivibrator is controlled by the incoming signal pulse, and if at the end of the timing period, the signal still shows the pulse, it is passed to the output. However, such a timer responds slowly to interruptions of the pulse and so will accept a group of short noise pulses as a message pulse.

SUMMARY OF THE INVENTION

In accordance with the present invention, I observe the lever of the incoming signal continuously. In response to each change to the opposite level, I begin counting and I accept such a change in level as part of the message only if it persists for a predetermined number of counts. The counting speed is high to provide good precision in the measurement of signal-level persistence and to reduce jitter in the output.

BRIEF DESCRIPTION OF THE DRAWINGS

These and other objects and advantages will be apparent from the following description, by way of example, of one specific embodiment of my invention, taken in connection with the accompanying drawings, wherein.

DESCRIPTION OF THE PREFERRED EMBODIMENT

Figure 1:
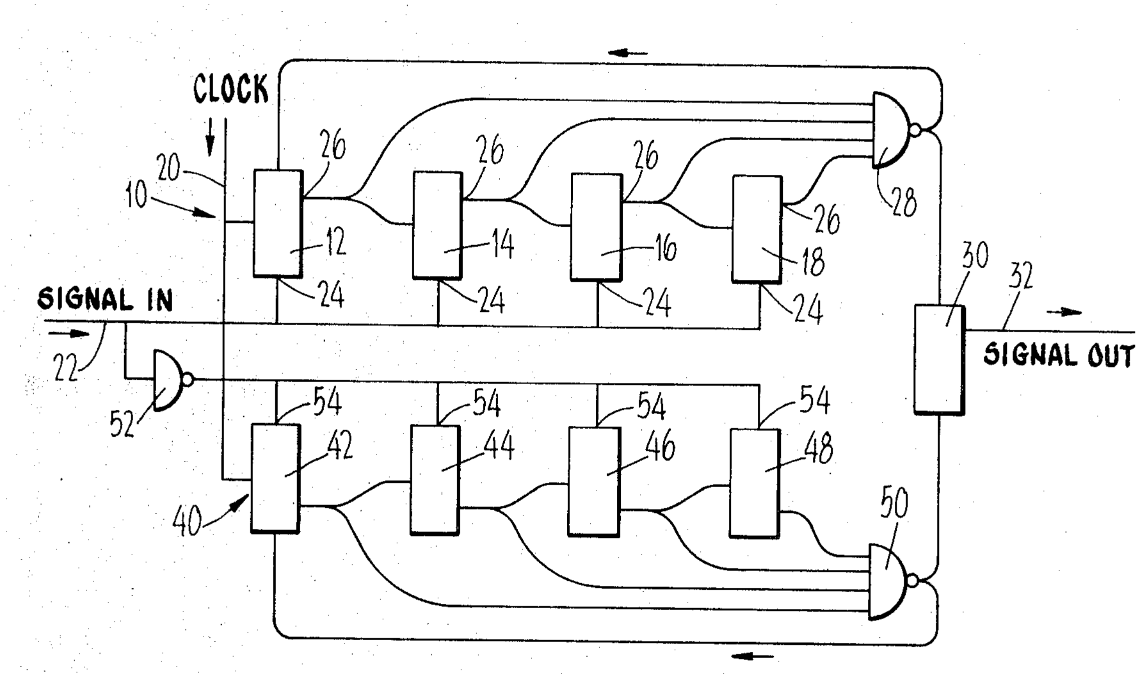
FIG. 1 is a circuit diagram of a digital filter.

In FIG. 1, a four-bit counter 10 includes flip-flops 12, 14, 16 and 18 and counts clock pulses which are applied from a clock bus 20 to the flip-flop 12. An input signal from an input bus 22 is applied to the reset inputs of all four flip-flops 12, 14, 16 and 18. The input signal on bus 22 has two values, here arbitrarily designated "ZERO" and "ONE ". When the input signal is ZERO, the flip-flops 12, 14, 16 and 18 are reset and held so that the outputs at their terminals 26 are all at ZERO. When the input signal is ONE, the counter 10 counts the clock pulses from the bus 20. The outputs 26 of the four flip-flops 12, 14, 16 and 18 are applied to a NAND gate 28, which produces an output ZERO when all four of its inputs are at ONE, and produces an output ONE under all other conditions. The output of NAND 28 is applied to the flip-flop 12 for holding it at ONE and is applied also to an output flip-flop 30 for driving it to a ONE condition, in which its output bus 32 carries a signal ONE.

A second four-bit counter 40 comprising flip-flops 42, 44, 46 and 48 similarly counts clock pulses from the bus 20 and similarly applies the outputs of those flip-flops to a NAND 50. When the four flip-flops of the counter 40 stand at 1111, a ZERO output from the NAND 50 is applied to the flip-flop 42 for holding it at ONE, and is applied also to the flip-flop 30 for driving it to the ZERO condition so that the signal on its output bus 32 is at ZERO. The input signal from the input bus 22 is applied to a NAND 52, operating as an inverting amplifier, and the output of this NAND 52 is applied to the reset inputs 54 of the flip-flops 42, 44, 46 and 48. Similarly to counter 10, counter 40 runs when a ONE signal is applied to its reset terminals 54 and is reset and held when a ZERO is applied to terminals 54.

When the input signal on the bus 22 is at ONE, the counter 10 runs, and the counter 40 is reset to 0000 and held there. When the input signal is at ZERO, the counter 40 runs, and the counter 10 is reset to 0000 and held reset. Assume that the input signal on bus 22 has been at ZERO and so has reset the counter 10. When the signal goes to ONE, counter 10 beings counting, starting from the state 0000. Assume that the input signal stays at ONE until the counter 10 reaches the state 1111. The resulting ZERO output of NAND 28 will drive the flip-flop 30 to its state ONE, so that the signal on its output bus 32 goes to ONE, to agree with the ONE signal on the input bus 22. The ZERO output from the NAND 28 is applied also to the flip-flop 12 for holding it at ONE for thereby holding the counter 10 at state 1111, because further counting under this condition would serve no purpose.

Similarly, when the input signal on bus 22 goes to ZERO, counter 10 is reset. Counter 40, starting from state 0000, counts the clock pulses from bus 20. At the 15th count, with the counter 40 at state 1111, the NAND 50 passes a ZERO signal to the flip-flop 30 for changing it to the ZERO state so that its output signal on bus 32 goes to ZERO to agree with the ZERO signal on the input bus 22. The output from NAND 50 is also applied to the flip-flop 42 for holding it at ONE and thereby holding the counter 40 at state 1111.

Accordingly, if a signal level on bus 22 persists through 15 clock pulses, it is repeated at the output bus 32 and it remains on the output bus 32 until a signal of the opposite level persists during 15 clock pulses. For example, assume that a ZERO signal on the input bus 22 has persisted through 15 clock pulses so that the counter 40 stands at 1111, and the flip-flop 30 stands at ZERO with a signal ZERO on the output bus 32. When the input signal on bus 22 changes to one, the counter 40 is reset to 0000 and the flip-flop 30 is left at state ZERO, so that the output signal on bus 32 remains at ZERO. Now the counter 10 begins running, counting the clock pulses from bus 20. If, before the counter 10 reaches the state 1111, the input signal on bus 22 returns to ZERO, that ZERO signal will immediately reset the counter 10 to 0000 and permit the counter 40 to run; and another change in the input signal may reset the counter 40 and start the counter 10, all without delivering a new signal to the flip-flop 30. Alternatively, the counter 40 may run to the state 1111 so that a ZERO signal from the NAND 50 is applied to the flip-flop 42 for stopping the counter 40 and also is applied to the flip-flop 30. However, under this condition, the flip-flop 30 is already at the ZERO state so that counter 40, on reaching the state 1111, produces no change in the output signal on bus 32.

Thus, each new signal level at the input bus 22 that persists for 15 clock pulses is applied, at the end of those 15 pulses, to the output signal bus 32, and so is retained as part of the message, but any new signal level which does not persist for 15 clock pulses is not repeated at the output bus 32, and so is rejected.

Figures 2, 3:
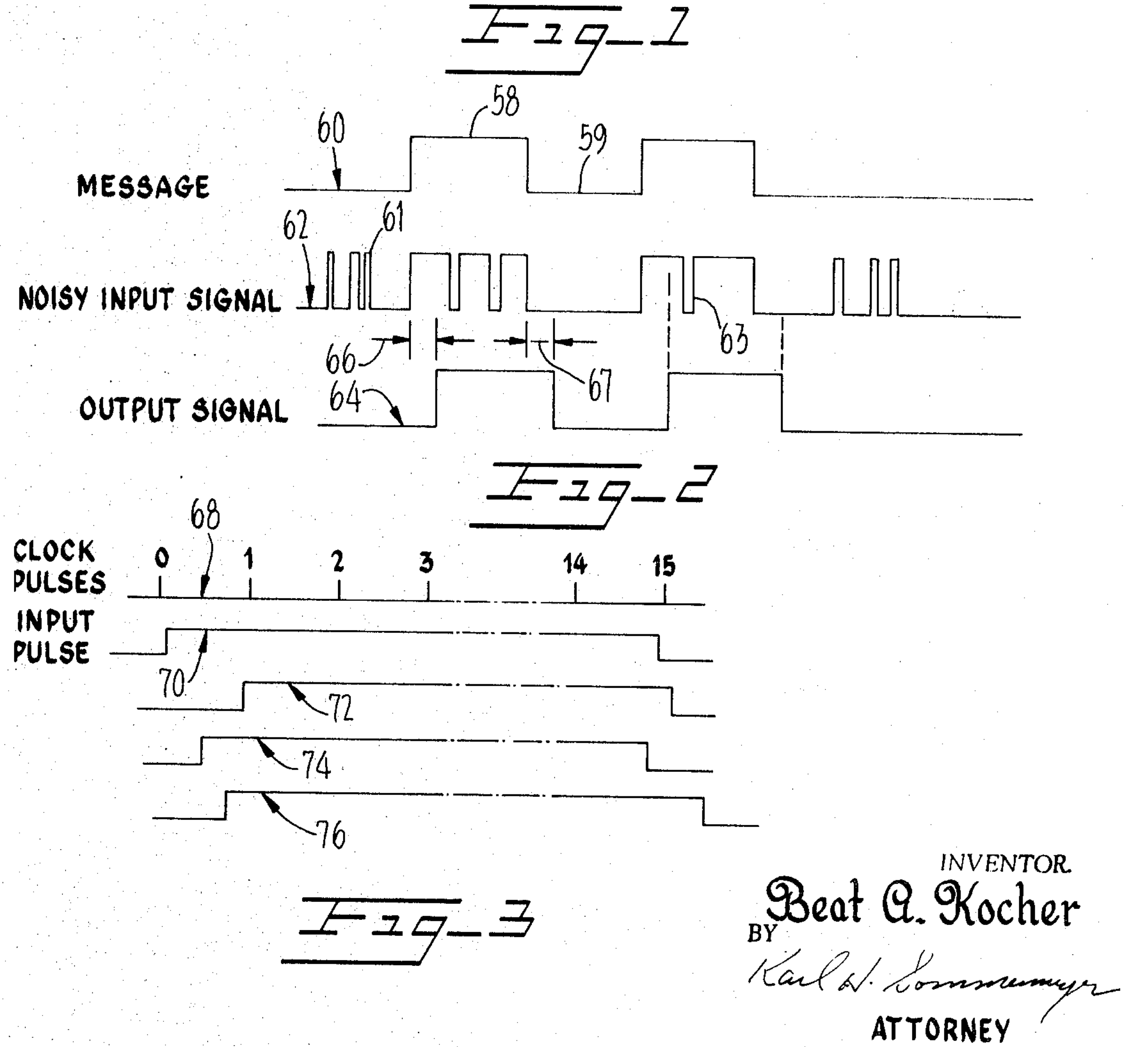
FIG. 2 is a graph depicting message and signal levels.
FIG. 3 is a graph depicting certain time relations between short signal pulses and the clock pulses.

In FIG. 2 the curve 60 depicts a hypothetical message consisting of high values 58 and low values 59 occuring alternately. The curve 62 depicts an input signal consisting of the same message with additional short pulses, such as 61 and 63, which are not part of the message and so constitute "noise". The system of FIG. 1 rejects the short pulses and reproduces the message signal in the output as depicted by curve 64, but reproduces it with a time delay, indicated at 66 and 67, which time delay results from the action of the system in waiting for a signal change at input bus 22 to persist for 15 counts before reproducing it at the output bus 32.

The parameters of the circuit should be chosen to suit the particular signal it is to pass, and to eliminate the kind of noise that is to be expected in the particular application. The interval of the clock signal should be chosen to give the desired precision in the measurement of the minimum pulse length and to reduce the jitter in the output signal to an acceptably low value. With the clock interval chosen, the counters 10 and 40 should have sufficient counting capacity to measure the desired minimum pulse persistence. The two counters 10 and 40 may have different counting capacities, may count at different rates, and may measure different pulse-persistence times.

In one particular application, the present invention was designed to eliminate both transmission and local noise from a printing telegraph circuit. The message was transmitted at 150 bits per second, so that the bit interval was 6.67 millisecond. The minimum acceptable duration for a pulse, indicated, for example, as the time 66 in FIG. 2, was chosen at five percent of the bit interval, or 0.333 millisecond. The four-bit counter makes 15 counts in counting from 0000 to 1111, so that the minimum length of a pulse so measured would span 14 clock intervals. Accordingly the clock interval was chosen as one-fourteenth of .333 millisecond or .023 millisecond. In that particular system, the time required for flip-flops of counter 10 and 40 to reset was 25 to 50 nanoseconds, or approximately .001 to .002 times the clock interval.

The manner in which the measurement of the minimum pulse length varies is illustrated in FIG. 3. There, a curve 68 depicts a series of consecutive clock pulses numbered 0 to 15 arranged along a horizontal time scale. Clock pulse No. 1 is the first clock pulse that occurs after the change of input signal that enables the counters, so that in this diagram the pulse to be measured must begin some place between the two clock pulses labeled 0 and 1. The maximum length of the noise pulse that can be rejected is indicated by a pulse 70 which beings just after the count 0 and ends just before the count 15. Such a pulse will be just under 15 clock intervals long. The minimum length of a message pulse that can be accepted is indicated by a pulse 72. It begins just before the count 1 and persists to and including the count 15, and so is substantially 14 clock intervals long. Pulses having lengths between these two values will be accepted or rejected depending on the time of their occurrences relative to the clock pulses. For example, a signal pulse 74 that is 14½clock intervals long will be rejected because it starts early in the interval between clock pulses 0 and 1 and so ends before clock pulse 15. But signal pulse 76, also 14½ clock intervals long, will be accepted because it begins later in the interval between clock pulses 0 and 1 and lasts through clock pulse 15. The resulting imprecision in the measurement of the minimum acceptable pulse length adds jitter to the signal, but the jitter is limited to one clock interval, and can be reduced to any desired extent by increasing the clock frequency and increasing the capacity of the counter accordingly.

I claim:

1. In a system for receiving input signal pulses of a first value and a second value, including a source of regularly recurring clock pulses, an improved filter for eliminating noise pulses from said input signal pulses, said filter comprising:

first counting means responsive to the presence of an input signal pulse of said first value for counting up to a first predetermined number of clock pulses;

means for generating a first control signal when said input signal pulse is at said second value, and a second control signal when said input signal pulse is at said first value;

second counting means being responsive to said first control signal for counting up to a second predetermined number of clock pulses;

first gate means responsive to the presence of said first predetermined number of clock pulses in said first counting means for generating a third control signal;

second gates means responsive to the presence of said second predetermined number of clock pulses in said second counting means for generating a fourth control signal;

said first counting means being responsive to the presence of said third control signal for maintaining said first predetermined count in said first counting means;

said second counting means being responsive to the presence of said fourth control signal for maintaining said second predetermined count in said second counting means;

bistable means switchable between a first state and a second state for transmitting an output signal of a first value when in said first state and for transmitting an output signal of a second value when in said second state, said bistable means being responsive to said third control signal for switching from said second state to said first state and being responsive to said fourth control signal for switching from said first state to said second state;

said first counting means being responsive to said input signal pulses for clearing any count contained therein when said input signal pulses are of said second value;

said second counting means being responsive to said second control signal for clearing any count contained therein.